United States Patent
Kager et al.

(10) Patent No.: US 6,601,813 B1
(45) Date of Patent: Aug. 5, 2003

(54) HAIR STYLING ACCESSORY HOLDER

(76) Inventors: Kevin F. Kager, 8 Roney Rd., Edison, NJ (US) 08820; Vincent J. Conticelli, 8 Roney Rd., Edison, NJ (US) 08820

( * ) Notice: Subject to any disclaimer, the term of this patent is extended or adjusted under 35 U.S.C. 154(b) by 0 days.

(21) Appl. No.: 09/533,701

(22) Filed: Mar. 23, 2000

Related U.S. Application Data

(60) Provisional application No. 60/126,139, filed on Mar. 25, 1999.

(51) Int. Cl.$^7$ .................................................. A47F 5/00
(52) U.S. Cl. ............. 248/314; 248/288.31; 248/288.51; 248/311.2
(58) Field of Search .......................... 248/311.2, 117.1, 248/117.4, 117.5, 117.6, 117.7, 229.15, 229.25, 278.1, 176.2, 176.1, 181.1, 230.6, 231.71, 314, 316.1, 288.31, 288.51, 227.4, 228.6, 27.1; 34/90

(56) References Cited

U.S. PATENT DOCUMENTS

| | | | | |
|---|---|---|---|---|
| 180,881 A | * | 8/1876 | Howson ................ 248/288.51 |
| 273,857 A | * | 3/1883 | Kirk ....................... 248/229.15 |
| 822,809 A | | 6/1906 | Young |
| 1,460,697 A | * | 7/1923 | Bendlin ................... 248/276.1 |
| 1,543,037 A | * | 6/1925 | Teeter .................... 248/288.51 |
| 2,375,565 A | | 5/1945 | Liakopulos ................ 248/282 |
| 2,711,300 A | * | 6/1955 | Nelson ...................... 248/214 |
| 2,950,836 A | | 8/1960 | Murdock ........................ 220/1 |
| 3,146,982 A | * | 9/1964 | Budnick .................... 248/68.1 |
| 3,843,083 A | * | 10/1974 | Angibaud .............. 248/229.15 |
| 3,964,708 A | | 6/1976 | Reeves ....................... 248/126 |
| 3,987,993 A | | 10/1976 | Hopkins ..................... 248/210 |
| 4,094,076 A | * | 6/1978 | Baslow ........................... 34/90 |
| 4,214,739 A | * | 7/1980 | Dailey .......................... 269/75 |
| 4,225,106 A | | 9/1980 | Eplan .................... 248/309 R |
| 4,320,883 A | * | 3/1982 | Bass .......................... 248/104 |
| 4,338,707 A | | 7/1982 | Byerly ......................... 24/257 |
| D273,044 S | * | 3/1984 | Holcomb .................... D24/48 |
| 4,453,695 A | * | 6/1984 | Sennott et al. .............. 248/660 |
| D274,601 S | * | 7/1984 | Helme ......................... D8/380 |
| 4,461,284 A | * | 7/1984 | Fackler ........................ 128/20 |
| 4,466,203 A | * | 8/1984 | Thomas ......................... 34/99 |
| 4,595,008 A | * | 6/1986 | Guibert ....................... 128/399 |
| 4,600,111 A | | 7/1986 | Brown ........................... 215/6 |
| 4,673,148 A | | 6/1987 | Oliver ......................... 248/293 |
| 4,696,447 A | | 9/1987 | Strecker ................... 248/206.3 |
| 4,712,313 A | | 12/1987 | Gettleman ..................... 34/97 |
| 4,735,388 A | * | 4/1988 | Marks ......................... 248/103 |
| 4,746,090 A | | 5/1988 | Hamilton .................... 248/314 |
| 4,818,055 A | | 4/1989 | Patterson ................... 350/96.2 |
| 4,874,142 A | | 10/1989 | Gelatt ......................... 248/185 |
| 4,877,164 A | | 10/1989 | Baucom .................... 224/42.44 |
| D314,502 S | | 2/1991 | Weldin ........................ D8/373 |
| 5,054,726 A | | 10/1991 | Mattox .................... 248/206.5 |
| 5,172,880 A | | 12/1992 | McDougall ................. 248/185 |
| 5,187,744 A | * | 2/1993 | Richter ........................ 379/449 |
| 5,199,678 A | | 4/1993 | Luebke .................... 248/311.2 |
| 5,224,679 A | | 7/1993 | Code .......................... 248/314 |

(List continued on next page.)

OTHER PUBLICATIONS

Brochure for Panavise® Camera Mounts, ca. 1996.

*Primary Examiner*—Kimberly Wood
(74) *Attorney, Agent, or Firm*—Pennie & Edmonds LLP

(57) ABSTRACT

A holder for supporting and holding at least one article relative to and spaced apart from a support surface is provided. The holder includes a receptacle, a clamp configured to couple the receptacle to the support surface, and a coupling arm coupled between the receptacle and the clamp. The coupling arm is coupled to the receptacle at a receptacle coupling joint, and the coupling arm is coupled to said clamp at a clamp coupling joint. Both the receptacle coupling joint and the clamp coupling joint permit movement in more than one plane. Preferably, at least one of the coupling joints is a ball joint.

8 Claims, 9 Drawing Sheets

U.S. PATENT DOCUMENTS

| | | | | |
|---|---|---|---|---|
| 5,234,251 A | | 8/1993 | Ayotte | 297/194 |
| 5,261,554 A | | 11/1993 | Forbes | 220/412 |
| 5,295,650 A | | 3/1994 | Brandt | 248/311.2 |
| 5,320,406 A | | 6/1994 | North | 297/194 |
| 5,354,026 A | * | 10/1994 | Bulla | 248/229 |
| 5,385,324 A | | 1/1995 | Pryor et al. | 248/231.7 |
| 5,485,931 A | | 1/1996 | Barr, Jr. | 211/70.6 |
| 5,613,305 A | * | 3/1997 | Narrin | 34/90 |
| 5,628,485 A | * | 5/1997 | Ray | 248/311.2 |
| 5,743,415 A | | 4/1998 | Smart | 211/70.6 |
| 5,842,670 A | | 12/1998 | Nigoghosian | 248/160 |
| 5,853,158 A | * | 12/1998 | Riggle | 248/311.2 |
| 5,887,940 A | | 3/1999 | Anderson et al. | 297/135 |
| 5,956,862 A | * | 9/1999 | Bondi | 34/97 |
| 5,964,439 A | * | 10/1999 | Johnson | 248/278.1 |
| 5,996,957 A | | 12/1999 | Kurtz | 248/311.2 |
| 6,123,299 A | * | 9/2000 | Zach, Sr. | 248/117.1 |
| 6,220,556 B1 | * | 4/2001 | Sohrt et al. | 248/279.1 |
| 6,227,511 B1 | * | 5/2001 | De Costa | 248/311.2 |

\* cited by examiner

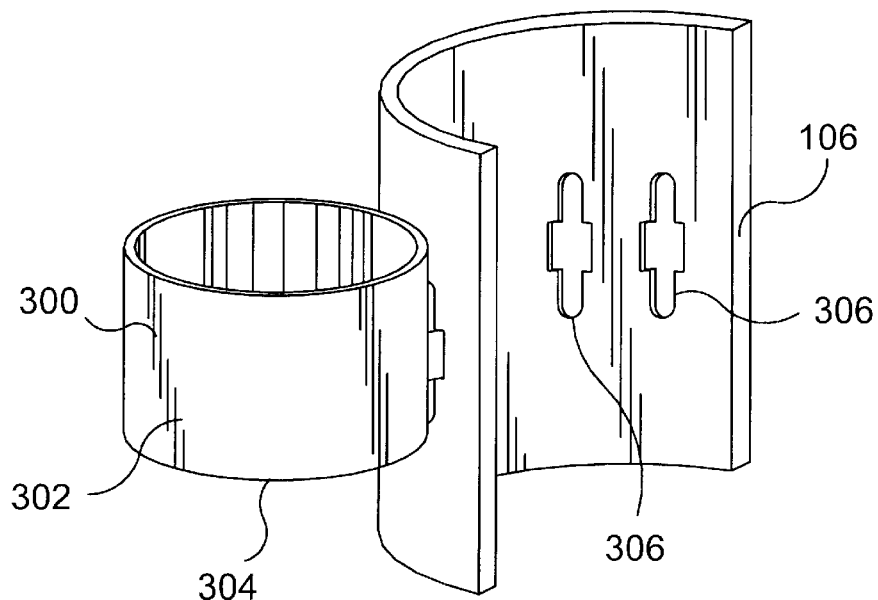
Fig. 14
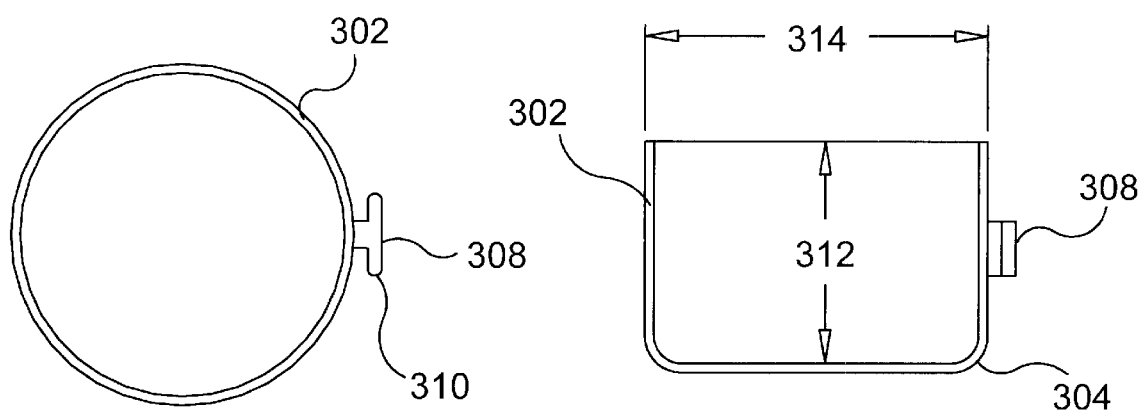
Fig. 15                    Fig. 16

HAIR STYLING ACCESSORY HOLDER

CROSS-REFERENCE To RELATED APPLICATION

This application claims priority of U.S. provisional patent application Ser. No. 60/126,139 filed Mar. 25, 1999, which application is hereby incorporated by reference in its entirety.

BACKGROUND OF THE INVENTION

The present invention relates to devices for retaining objects and, more particularly, to devices configured for removable attachment to a surface for conveniently retaining hairstyling accessories.

The desirability of providing a holder for a blow dryer or other appliance, especially for accommodating blow dryers of a variety of different shapes and sizes, has been recognized. For example, U.S. Pat. No. 5,172,880 to John McDougall discloses a holder having a base, a support arm, and an open frame member for receiving the barrel of a blow dryer. The holder may be rested on a horizontal surface such as a table, or alternatively may be mounted to a wall by engaging a keyhole-shaped slot in its base with a screw head projecting from a wall.

In addition, U.S. Pat. No. 4,696,447 to Dennis Strecker also discloses a blow dryer holding device. The device includes a base that is attached to a vertical support surface (such as a mirror) using suction cups, a pivot projection, and a retainer assembly pivotally connected to the projection with a clevis-shaped rib. The orientation of this device may be adjusted only in one plane.

Devices for holding other types of articles have been developed for coupling to a support surface. For example, U.S. Pat. No. 3,987,993 to Jeffrey Hopkins shows a combination paint can support and brush receptacle which is releasably clamped to the side rail of a ladder. A rivet joins the paint can receptacle with the clamping means, so that pivoting about the rivet allows the can support to attain a level position during use. However, the rivet does not allow for adjustment of the horizontal position of the can with respect to the ladder.

Another type of holding device is disclosed in U.S. Pat. No. 5,295,650 to Beverly Brandt. This patent shows an adjustable beverage holder for coupling to a folding lounge chair. The beverage holder includes a beverage receptacle, an arm, a fastener for removably attaching a first end of the arm to the folding lounge chair, and a mechanism for adjustably coupling the beverage receptacle to a second end of the arm. Swivel fasteners allow the arm to pivot in a horizontal plane with respect to the chair, and a ball and socket universal joint resists adjustment of the position of the beverage receptacle.

U.S. Pat. No. 4,877,164 to Walter Baucom discloses a device for holding cups, cans, and similar articles in vehicles. The device includes three jointed members, one of which terminates at an end in an expandable plug mounting means that is adapted to be secured into an opening such as a cigarette lighter socket in a car. An adjustable detent-type joint is used to allow rotation of the jointed members with respect to each other in one plane.

Despite the above-described article holder developments, none meets the demands of beauticians in beauty salons that service a wide-variety of customer needs. The beauticians or hairstylists must be able to store a diverse assortment of hairstyling and cosmetic accessories in a convenient but unobtrusive fashion as they work. The beautician has a diversified workload, engaging in such activities as hair cutting, shaving, hair coloring, bleaching, frosting, highlighting, perming, french braiding, corn rowing, eye brow thinning, and other styling tasks. Thus, the beautician must have access to such varied hairstyling accessories as scissors, combs, brushes, hair dryers, razors, trimmers, clippers with variable-sized blade attachments, tweezers, roller sets, curling irons, dyes, and other hair and/or scalp treatment liquids, gels, and foams. Additionally, such other indispensable items as barrettes, hair clips, and bobby pins are regularly used. Because clientele have a wide range of needs, modern hairstyling and cosmetology professionals are challenged to maintain equipment and other essentials in an efficient manner at a convenient, accessible location as they work.

The many electrical appliances used in salons also present a safety hazard, as contact with water can cause the user to suffer a severe electrical shock. Water can pool on countertops and thus it is not desirable to place appliances such as hair dryers on a countertop for storage when not in use. Moreover, such countertop areas typically are also very cluttered with other objects, so that beauticians are forced to temporarily hold the hair dryer between their legs or obtain assistance from another individual while performing tasks that require use of both hands.

The holder disclosed in the patent to McDougall does not allow convenient storage of multiple accessories, and is not readily positioned near the beautician for ready access during performance of an activity. The other above-described patents only disclose holders with a limited range of orientation adjustment. Greater adjustability and readier, more convenient mounting for use in a salon are desirable.

Accordingly, there exists a need for a holder that can be positioned close to a stylist, yet is adjustable to meet the needs of different stylists. There also exists a need for a hairstyling accessory holder with a universal clamp for gripping arcuate as well as sharp-edged surfaces, and a receptacle having position adjustment means.

SUMMARY OF THE INVENTION

In accordance with the principles of the present invention, a holder for supporting and holding at least one article relative to and spaced apart from a support surface is provided. The holder includes a receptacle, a clamp configured to couple the receptacle to the support surface, and an adjustable coupling arm coupled between the receptacle and the clamp. The coupling arm is coupled to the receptacle at a receptacle coupling joint and to the clamp at a clamp coupling joint. Both the receptacle coupling joint and the clamp coupling joint permit movement in more than one plane. In a preferred embodiment, at least one of the coupling joints is a ball joint. Preferably, both of the coupling joints are ball joints. The coupling arm may be formed with first and second connector elements. The first and second connector elements each have first and second ends, with the second end of the first connector element and the second end of the second connector element rotatably coupled together. A transition member may be coupled between the first and second connector elements. The first and second connector elements preferably are coupled to the transition member for rotation about the transition member longitudinal axis.

Preferably, a first lock is provided for fixing relative movement between the coupling arm and the receptacle, and a second lock is provided for fixing relative movement between the coupling arm and the clamp. If the coupling arm includes first and second connector elements with a transition member therebetween, then locks for fixing relative movement of the connector elements with respect to the transition member may also be provided.

Another aspect of the present invention is a method of coupling a receptacle configured for holding hairstyling accessories to a hairstylist chair. The method includes the steps of providing a receptacle configured for holding hairstyling accessories with a coupling arm, coupling the coupling arm to a first portion of the hairstylist chair, and adjusting the coupling arm and the receptacle to move the receptacle adjacent a second portion of the hairstylist chair. Preferably, the method further includes the steps of coupling the coupling arm to the arm of the hairstylist chair and moving the receptacle to immediately adjacent the back of the chair. The method may also include the steps of adjusting the position of the receptacle relative to the chair both in a horizontal and a vertical plane.

In accordance with the principles of the present invention, a clamp configured for securely being clamped to an arm of a hairstylist chair is also provided. The clamp includes a first jaw having a first clamping surface and a second jaw having a second clamping surface. The first and second jaws are coupled together with the first and second clamping surfaces facing each other for movement relative to each other. The first clamping surface is arcuately shaped with a radius of curvature selected to engage the upper surface of an arm of most, if not all, hairstylist chairs, and the second clamping surface is arcuately shaped with a radius of curvature selected to engage the lower surface of an arm of most, if not all, hairstylist chairs.

In a preferred embodiment, the second clamping surface includes a pair of outer arcuate surfaces straddling an inner arcuate surface. The outer arcuate surfaces have a first radius of curvature, and the inner arcuate surface has a second radius of curvature. Preferably, the first radius of curvature is larger than the second radius of curvature so that the outer arcuate surfaces and the inner arcuate surface may engage differently configured surfaces.

The present invention is also directed to a holder for supporting and holding at least one article relative to and spaced apart from a support surface. The holder includes a hollow receptacle configured to receive and hold at least one article, and a coupling arm coupled to the receptacle and configured for coupling to a support surface. The receptacle has a longitudinal axis and first and second open ends along the longitudinal axis. The coupling arm is coupled to the receptacle at a position along the receptacle longitudinal axis closer to the first end than the second end. The receptacle may be rotated about the coupling arm between a first position, in which the receptacle longitudinal axis is vertical and the first end is positioned above the coupling arm at a first height, and a second position, in which the receptacle longitudinal axis is vertical and the second end is positioned above the coupling arm at a second height higher than the first height. The receptacle is positioned for holding an article by positioning the receptacle with an open end above the coupling arm and by placing a cap on the receptacle end below the coupling arm to form an interior holding chamber within the receptacle with a bottom support surface provided by the cap. Preferably, the cap is configured for detachable connection to either of the first and second ends of the receptacle, depending on the orientation of the receptacle, to form the bottom support surface of the interior holding chamber within the receptacle. The cap preferably has a plurality of detents along a periphery thereof for engagement with corresponding receiving elements, such as grooves, on the interior surface of the receptacle. The cap is thus readily attachable and detachable to the first or second end of the receptacle.

Preferably, the cap is vented. The cap may be provided with a screen element, or a plurality of apertures may be formed in the cap to provide ventilation to the interior of the receptacle. The holder may further include a gasket on the open end of the receptacle positioned above the coupling arm.

The receptacle may also include a holding bowl shaped and configured for placement within the open end of the receptacle to hold articles significantly smaller than the interior of the receptacle, and/or a bowl adapted for attachment to a side of the receptacle to hold articles significantly smaller than the interior of the receptacle.

BRIEF DESCRIPTION OF THE DRAWINGS

The invention will be better understood from the following detailed description of an exemplary embodiment thereof in conjunction with the accompanying drawings in which:

FIG. 14 is a perspective view, partially exploded, of an alternate receptacle with a side bowl used in accordance with a preferred embodiment of the present invention;

FIG. 15 is a top view of the side bowl of FIG. 14;

FIG. 16 is a cross-sectional view of the side bowl of FIG. 14; and

DETAILED DESCRIPTION OF THE INVENTION

The exemplary embodiments shown in the figures and described herein include holders similar to the holder disclosed in provisional application Ser. No. 60/126,139, filed Mar. 25, 1999, and incorporated herein in its entirety.

Figure 1:
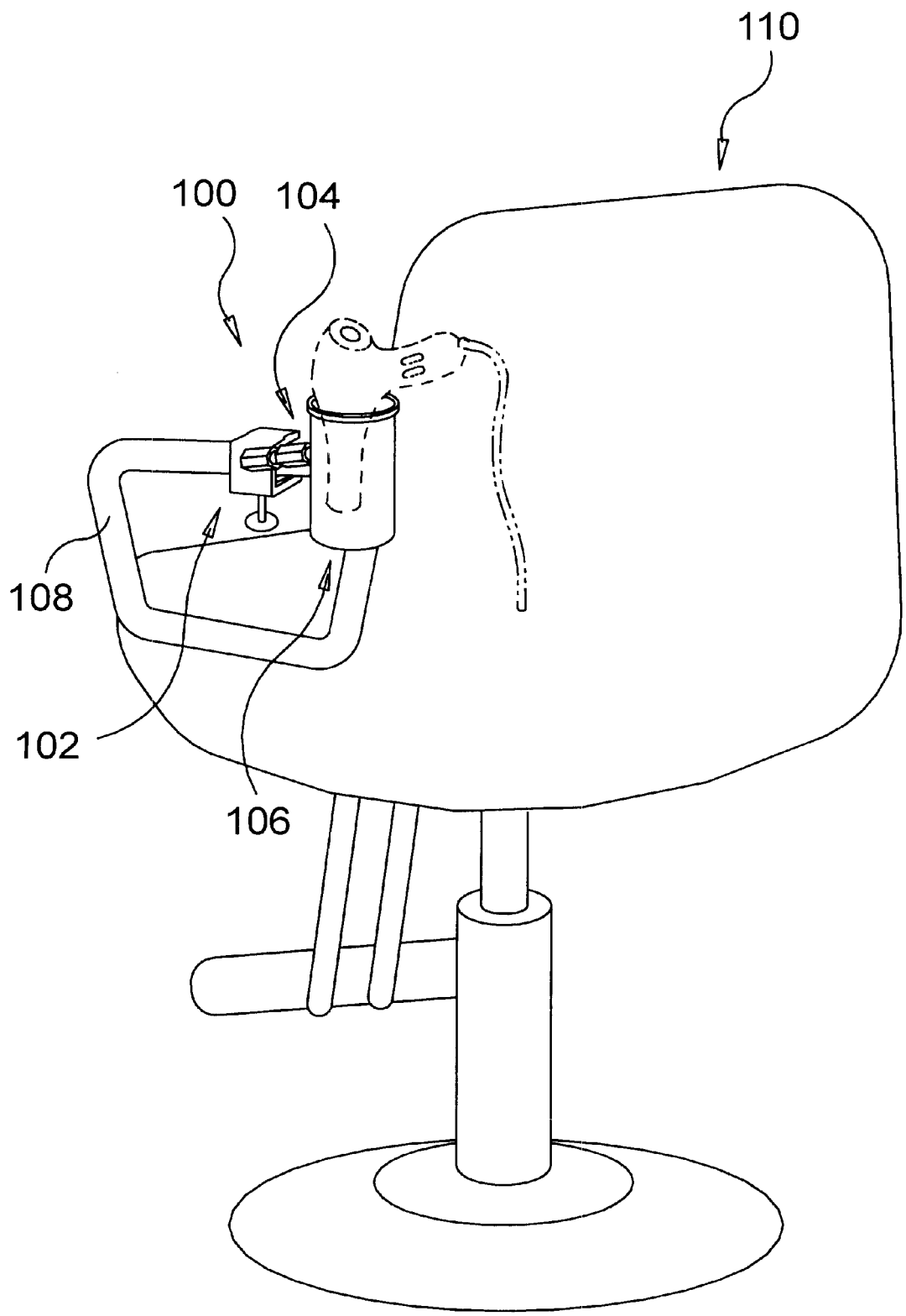
FIG. 1 is a perspective view of a holder installed on the arm of a chair in accordance with a preferred embodiment of the present invention.

Referring to FIG. 1, there is shown an exemplary holder 100 formed in accordance with the principles of the present invention. Holder 100 includes a clamp 102, coupling arm 104, and receptacle 106. Clamp 102 is shown attached to an arm 108 of styling chair 110. Preferably, clamp 102 is firmly attached to the arm of a chair. Those skilled in the art will recognize that clamp 102 may also be attached to the opposite arm of the chair, a countertop or other surface.

Figure 2:
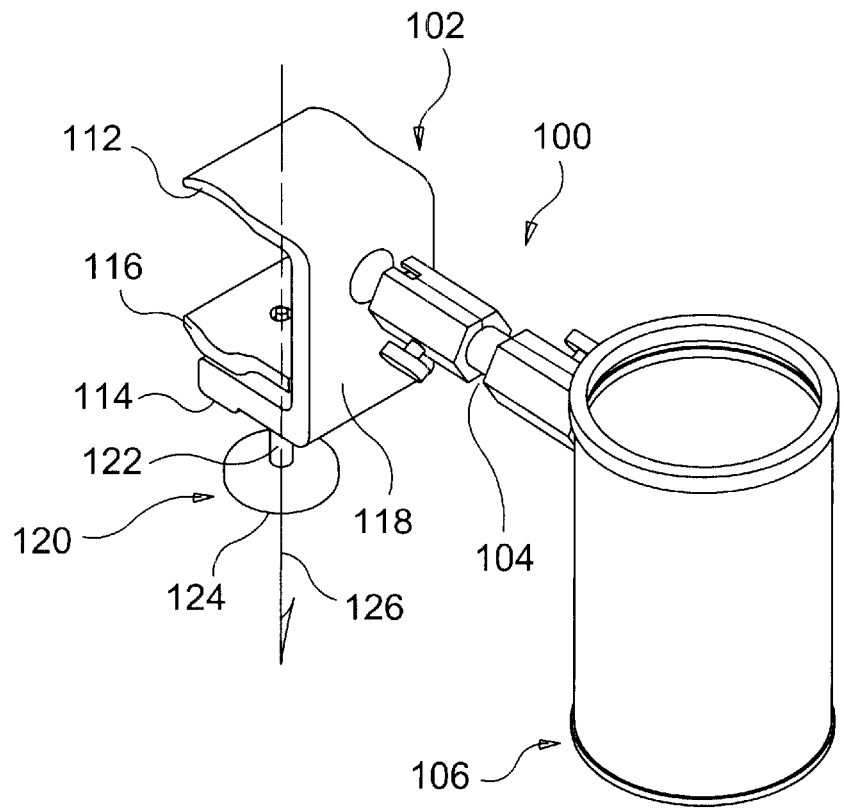
FIG. 2 is a perspective view of the holder of FIG. 1.
Figure 3:
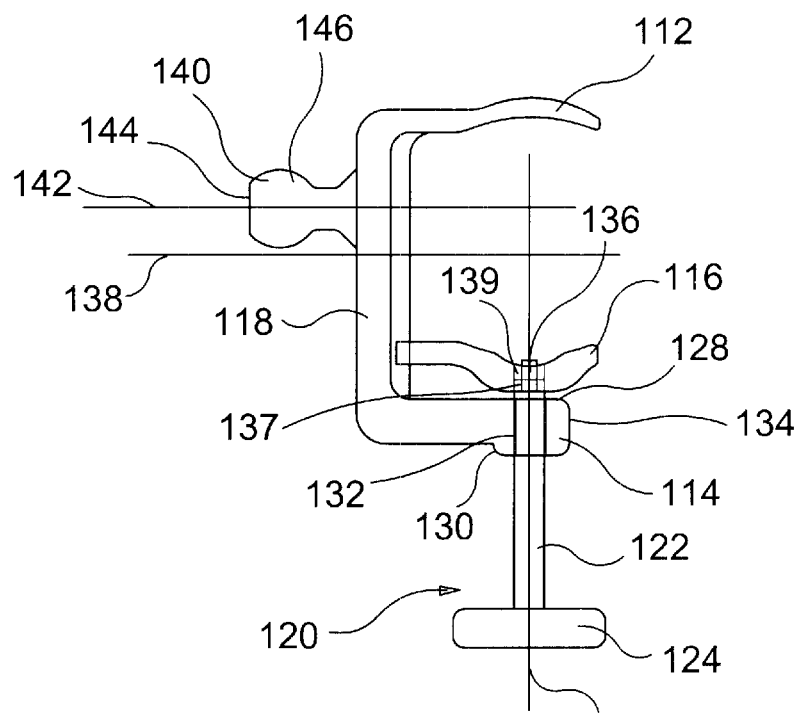
FIG. 3 is a side elevational view of the clamp used in the holder of FIG. 1.

Any desired clamp may be used to secure holder 100 to an object conveniently situated with respect to the user of an object to be held by holder 100. In the embodiment of FIG. 2, clamp 102 on holder 100 includes a fixed jaw 112, a lower member 114, and movable jaw 116 disposed therebetween. A side member 118 rigidly connects fixed jaw 112 and lower member 114. Adjusting handle 120 has a bolt 122 and ahead 124. Handle 120 is disposed along axis 126, which lies generally parallel to side member 118 and generally perpendicular to lower member 114. As further shown in FIG. 3, lower member 114 has an inner surface 128 and an outer surface 130. A bore 132 having an axis 126 extends through lower member 114, preferably in the vicinity of side 134, and connects inner surface 128 and outer surface 130. Bore 132 is configured to receive bolt 122. Preferably, bore 132 has internal threading which engages external threading on bolt 122. Bolt 122 extends through bore 132 to adjust the position of movable jaw 116. Preferably, end 136 of bolt 122 is received in a bore 137 in movable jaw 116 to couple bolt 122 and jaw 116 together.

A retainer 139 restricts movement of end 136 with respect to movable jaw 116, such that end 136 is permitted to rotate coaxially about axis 126 without being removed from movable jaw 116. Alternately, end 136 may be fixed to movable jaw 116 by other means such as press-fitted, friction-fitted, or coupled in any other manner which securely couples end 136 and movable jaw 116, yet allows rotation of end 136 in bore 137. By applying a torque to bolt head 124, bolt 122 is screwed into or out of bore 132, thereby moving the movable jaw 116 relative to fixed jaw 112. Alternatively, adjustment of movable jaw 116 may be achieved by manners other than rotation of bolt 122, such as by a ratcheting movement or other adjustable connections known in the art.

Figure 4:
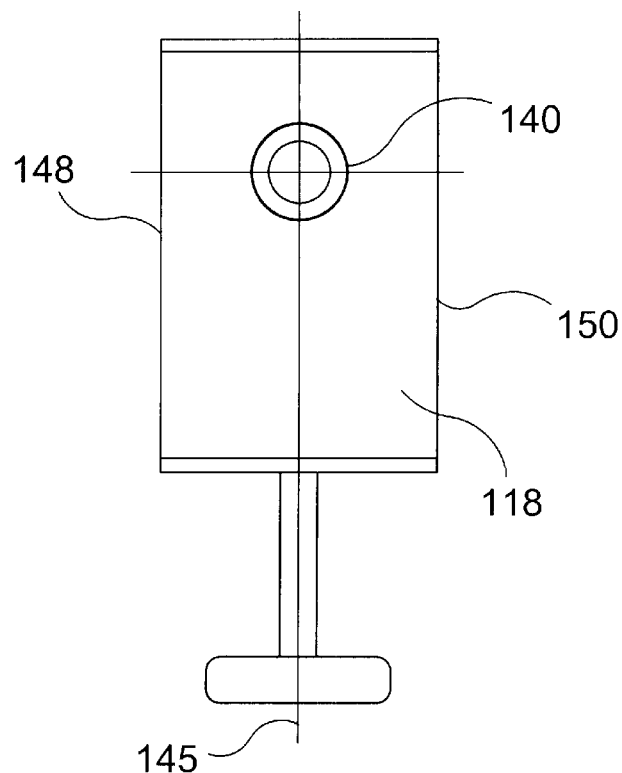
FIG. 4 is a rear elevational view of the clamp used in the holder of FIG. 1.

A central axis 138 of clamp 102 is positioned in a plane which is generally perpendicular to axis 126 and is located preferably halfway across the length of side member 118, midway between jaw 112 and lower member 114. Joint 140 lies on axis 142, preferably offset from central axis 138 and closer to fixed jaw 112 than lower member 114. Preferably, joint 140 is integrally manufactured with clamp 102 and has a flattened portion 144 and a rounded portion 146. An additional preferred alignment axis 145 for joint 140 is shown in FIG. 4. Joint 140 preferably is centered about axis 145, which lies halfway between substantially parallel sides 148, 150 of side member 118 (FIG. 4). This alignment enhances the stability of holder 100.

Figure 5:
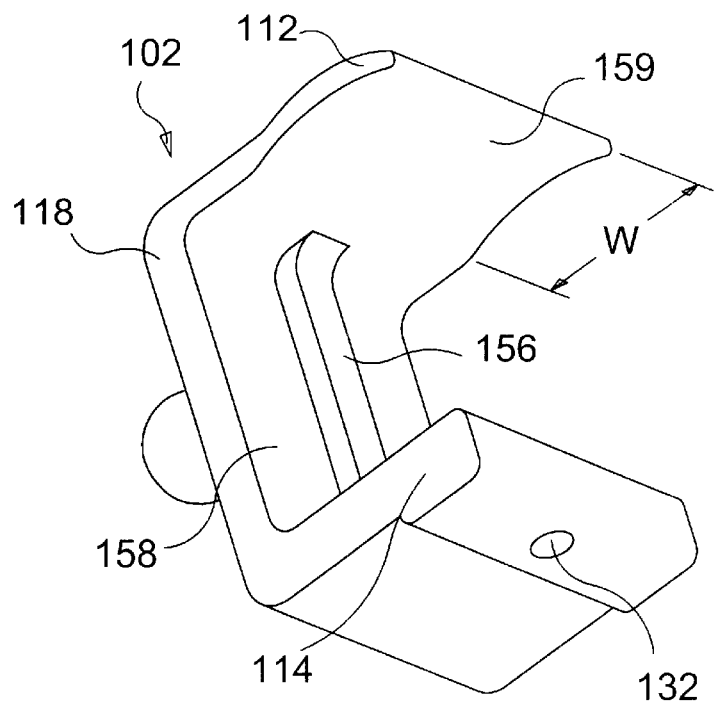
FIG. 5 is a perspective view of a portion of the clamp used in the holder of FIG. 1.

As shown in FIG. 5, in a preferred embodiment clamp 102 includes guide 156 centrally located along interior face 158 of side member 118 along axis 145. Preferably, guide 156 extends from fixed jaw 112 to lower member 114. Movable jaw 116 (not shown in this Figure) is provided with a notch that cooperates with guide 156 so that movable jaw 116 will remain centered within clamp 102 as the position of movable jaw 116 is varied along axis 126.

Figure 6:
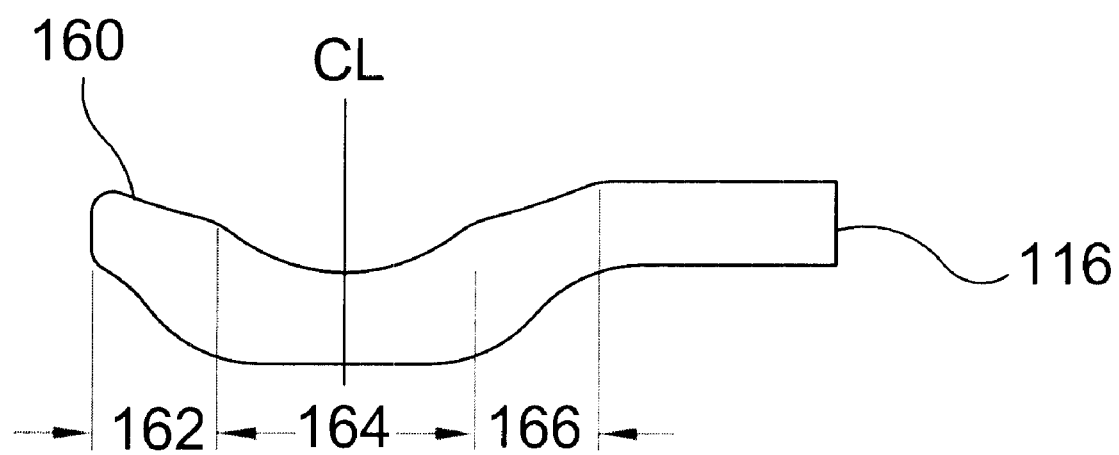
FIG. 6 is a side elevational view of the moveable jaw of the clamp used in the holder of FIG. 1.

Preferably, as illustrated schematically in FIG. 6, in accordance with the principles of the present invention, clamping surface 160 of movable jaw 116 has three arcuate portions 162, 164, 166, which form a universal clamping surface. Preferably, clamping surface 160 is substantially symmetrical about a center line CL. Two of the three arcuate portions, 162 and 166, are outer arcuate portions which straddle the third, inner arcuate portion 164. Preferably, outer arcuate portions 162, 166 have the same radius of curvature and function together to form a first clamping surface for the underside of chair arms which have a corresponding curvature. Preferably the radius of curvature of outer arcuate portions 162, 166 is different from that of inner portions 164. In a preferred embodiment, outer arcuate portions 162, 166 have a relatively large radius of curvature while inner arcuate portion 164 preferably has a smaller radius of curvature to accommodate those chair arm undersurfaces with a relatively small radius of curvature. For example, inner arcuate portion 164 preferably is shaped and configured to engage a tapered bottom chair arm surface. All three arcuate portions 162, 164, 166 may be used together for contoured chair arm undersurfaces. For example, if a metal support bar is provided below a cushioned portion of a chair arm, outer arcuate portions 162, 166 engage the cushion portion and inner arcuate portion 164 engages the support bar.

Upon examination of numerous stylist chairs, a radius of curvature of 44 mm as been determined to engage the undersurface of all of the examined stylist chair arms having relatively large radii of curvature. Thus, outer arcuate portions 162, 166 preferably have a radius of curvature of approximately 44 mm±5 mm. Similarly, upon examination of numerous stylist chairs, a radius of curvature of 13 mm has been determined to engage the undersurface of all of the examined stylist chair arms having relative small radii of curvature, including underlying support bars. Thus, inner arcuate portion 164 preferably has a radius of curvature of approximately 13 mm±2.5 mm. Moreover, as shown in FIG. 5, an overall width W of preferably approximately 36 mm±4 mm for fixed jaw 112 has been determined to fit on the arms of all of the examined stylist chairs. Preferably, the width of the clamping surfaces 159, 160 is selected not to exceed the horizontal width of a standard arm of a stylist chair. The maximum separation distance between fixed jaw 112 and moveable jaw 116 is preferably selected to be greater than the vertical width of a standard arm of a stylist chair.

Furthermore, in FIG. 5, the inner clamping surface 159 of fixed jaw 112 preferably is also provided with a unique curvature to form a universal clamping surface. Upon examination of numerous stylist chairs, a radius of curvature of 44 mm has been determined to engage the top surface of arm upper surfaces of all of the examined stylist chairs. Thus, the radius of curvature of inner curved clamping surface 159 is preferably 44 mm±5 mm. Moreover, an overall width of preferably approximately 36 mm±2.5 mm for fixed jaw 112 has been determined to fit on the arms of all of the tested stylist chairs.

Preferably, fixed jaw 112 is as thin as possible so that a person sitting in a chair with a holder clamped thereon will not be made uncomfortable when resting an arm at least partially on top of fixed jaw 112. The outer surface of fixed jaw 112 may also be covered with a cushion or fabric to increase the comfort attainable when a person's arm is situated above the jaw. In addition, preferably all edges on clamp 102 are tapered or rounded so that a person's arm will not encounter a sharp edge.

Figure 7:
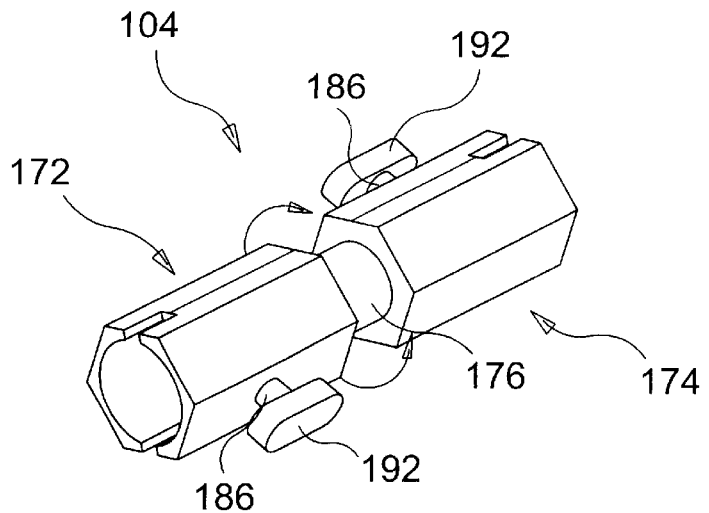
FIG. 7 is a perspective view of the coupling used in the holder of FIG. 1.
Figure 8:
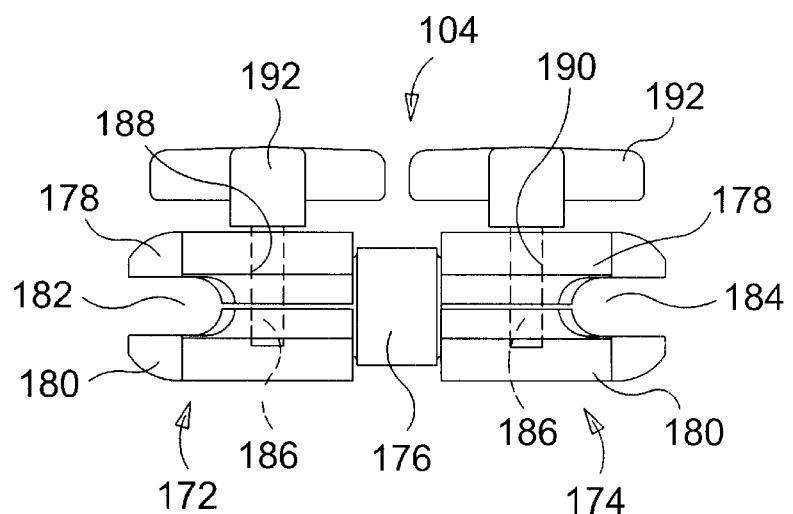
FIG. 8 is a side elevational view of the coupling used in the holder of FIG. 1.

As shown in FIG. 2, coupling arm 104, which couples receptacle 106 to clamp 102, is preferably configured to provide adjustability in more than one plane. Locks are provided to lock coupling arm 104 into a desired position, orientation, or configuration. In the embodiment of FIGS. 7 and 8, coupling arm 104 includes connectors 172, 174 and transition member 176 disposed therebetween. Each connector 172, 174 preferably has two halves 178, 180, as shown in FIG. 8, which are held in spaced relation by a spacer. Preferably, connectors 172, 174 are identical, having sockets 182, 184 that are adapted to receive coupling joints. Sockets 182, 184 may be at least partially joined in corresponding portions of halves 178, 180 of connectors 172, 174. The coupling joints provided on clamp 102 and receptacle 106 may be any suitable projection that can be retained by and within sockets 182, 184 of connectors 172, 174. Preferably, the coupling joints allow greater than one degree of freedom of motion. Most preferably, a ball joint is used for each coupling joint. Other types of coupling joints may also be used. Locking of coupling arm 104 is achieved by bringing halves 178, 180 closer together to clamp connectors 172, 174 with respect to the coupling joints.

In a preferred embodiment, the spacer which holds connector halves 178, 180 in spaced relation may also serve as the lock which brings connector halves 178, 180 together for locking. In the embodiment of FIGS. 7 and 8, connector halves 178, 180 are held in spaced relation by respective shafts 186 extending through holes 188, 190 in connector halves 178, 180. Shaft 186 may be threaded to engage interior threads within holes 188, 190 for controlled movement with respect to connectors 172, 174 by rotation of wing elements 192 on shafts 186. Alternatively, other types of elements may be disposed on shaft 186 to facilitate turning of shaft 186. For example, a set screw configuration may be used, including a head disposed on shaft 186. Moreover, any coupling resulting in adjustability other than threaded engagements may be used, and locking may be achieved by other means known in the art. It is preferred that such adjusting and locking elements may be manipulated by hand, rather than necessitating the use of a tool for adjustment as in the case of a typical nut.

Figure 9:
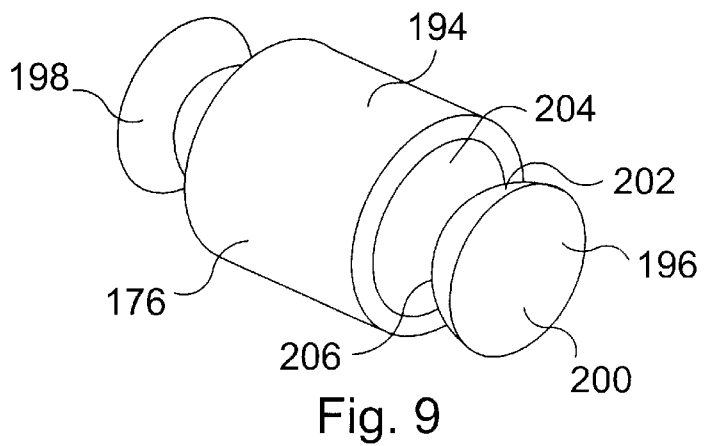
FIG. 9 is a perspective view of the transition member used in the coupling of FIG. 8.

Turning now to FIG. 9, above-described transition member 176 is shown in isolation. Transition member 176 allows the length of the coupling arm to be set at any given length, provided that the stability of arm 176 is not compromised by a transition member that is too long or flexible. Preferably, member 176 is formed of unitary construction, with cylindrical central body 194, and nubs 196, 198. Each nub preferably has a flat, circular outer face 200, a portion 202 that slopes inward to a smaller circumference than face 200, and a portion 204 that slopes outward to the diameter of face 200. Notably, a channel 206 is formed at the interface between portions 202, 204. Connector halves 178, 180 are coupled to member 176 by a clamping action about channels 206 when brought closer together as described above. Alternatively, no transition member may be used, such that coupling arm 104 is formed of unitary construction.

Figure 10:
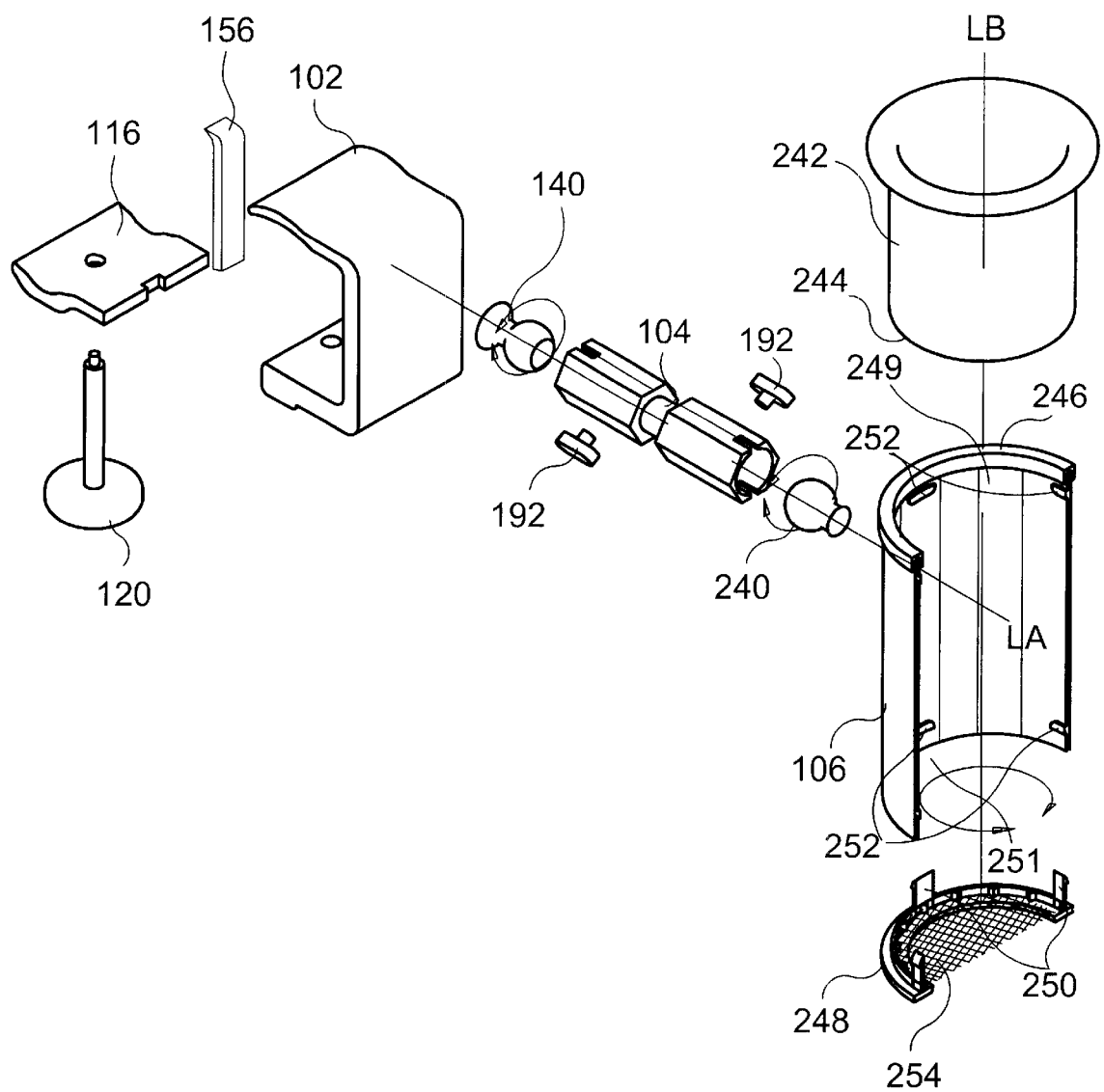
FIG. 10 is a partially exploded, partial cross-sectional view of the holder of FIG. 1.

Referring to FIG. 10, the major components of a preferred embodiment of the receptacle 106 are shown. In accordance with the principles of the invention, a second joint 240 is provided, preferably of unitary construction with receptacle 106 (shown in partial exploded view) to couple coupling arm 104 to receptacle 106. Joint 240 is preferably identical to joint 140 in geometry.

In a preferred embodiment of the invention, receptacle 106 is an open-ended cylinder that is sized to accommodate the heads of the full range of hand-held hair dryers. Bowl 242, with a solid bottom 244, may optionally be seated in the top portion of receptacle 106. The bowl may serve as a mixing dye bowl, or alternatively may be used to store hair clips, bobby pins, and other small items. Preferably, bowl 242 has a diameter of about 3 inches (7.62 cm), except along the upper rim at the open end of the bowl where the diameter is preferably 3.5 inches (8.89 cm) to provide a support ledge. Advantageously, an elastomeric gasket 246 is detachably mounted to the upper edge of receptacle 106. Gasket 246 preferably has smooth, non-sharp surfaces and thereby ensures that the open end of receptacle 106 is smooth and non-sharp. Preferably, gasket 246 is elastomeric and thus may serve to dampen vibrations that may occur if an electrical appliance is temporarily stored in receptacle 106 while still powered on. An elastomeric gasket also typically provides insulation between potentially heated articles which may be placed in receptacle 106 to prevent undesired heating of receptacle 106. In addition, gasket 246 provides a snug fit for bowl 242 in receptacle 106, and also provides aesthetic value to the receptacle.

Figure 11:
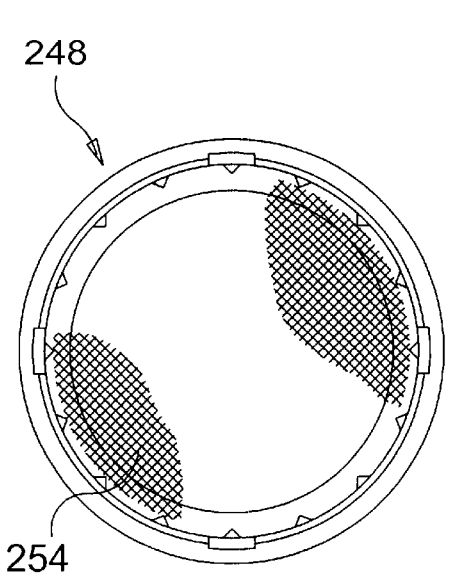
FIG. 11 is a top view of a cap with a screen which may be used in the holder of FIG. 1.
Figure 12:
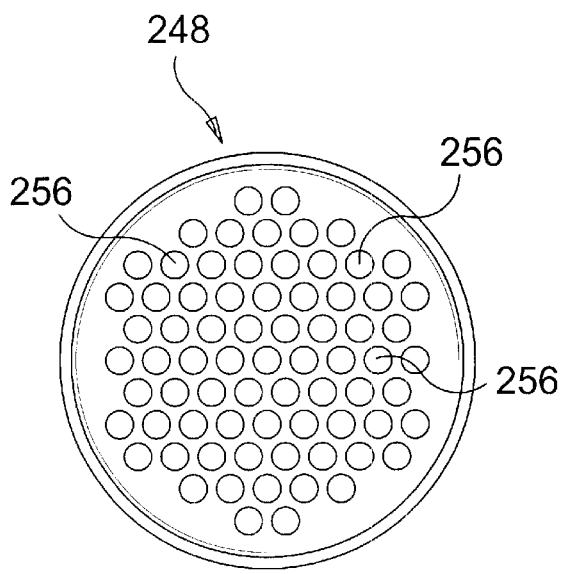
FIG. 12 is a top view of an alternate cap with holes for use with the holder of FIG. 1.

A cap 248 may be detachably mounted to either of open ends 249, 251 of receptacle 106 (typically the end functioning as the bottom end) in any desired manner. Thus, cap 248 is readily and easily removable, a convenience the benefit of which will become readily apparent. As shown further in FIGS. 11 through 13, cap 248 may be vented. For instance, a central screen or mesh 254 may be provided in cap 248. Alternatively, apertures 256 may be formed in cap 248. Thus, if a blow dryer were to be temporarily stored in receptacle 106 without being turned off, the air stream flowing from the blow dryer nozzle could be exhausted via the ventilation provided by mesh 254 or apertures 256 and build-up of excessive heat within receptacle 106 could be avoided. The use of apertures 256 also permits hairs and other particulate to fall through receptacle 106, rather than accumulate on the cap 248 inside the receptacle.

Figure 13:
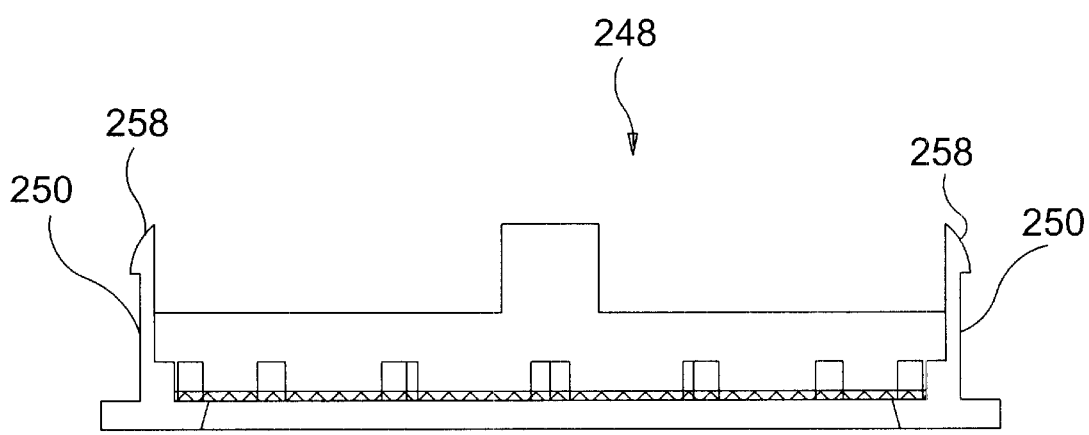
FIG. 13 is a side elevational view of a cap used in accordance with a preferred embodiment of the present invention.

In a preferred embodiment, as shown in FIG. 13, cap 248 is provided with detents 250 for engagement with a set of grooves 252 on the interior of receptacle 106 in the vicinity of an end 249, 251 of receptacle 106. Preferably, four detents are provided on cap 248. Each detent preferably has a hook-like end 258 shaped to engage a groove 252. A set of grooves 252 is preferably provided in the vicinity of each end 249, 251 of receptacle 106 so that cap 248 may be coupled to either end 249, 251. Grooves 252 preferably are disposed at regular intervals corresponding to detents 250. Preferably, cap 248 is turned to engage detents 250 with grooves 252 and, after partially turning cap 248, detents 250 are in interlocking engagement with grooves 252 in receptacle 106. Such engagement may either be a one-way engagement, in which further turning of cap 248 results in tightening of the connection, or a two-way engagement, in which further turning of cap 248 results in sequential engagement and disengagement of detents 250 with alternate grooves 252. To release cap 248 engaged with grooves 252 by a one-way engagement, reverse turning disengages the detents from their interlocking positions with grooves 252. Release of a cap 248 engaged by a two-way engagement is simpler, and merely requires further turning of cap 248 in the same direction as for engagement to disengage detents 250 from grooves 252. Either mechanism provides a secure, yet easy to operate means for switching the type of cap used on a holder, and for cleaning if required.

Alternatively, the inner surface in the vicinity of open ends 249, 251 of receptacle 106 may be threaded, and thus configured to receive threaded caps. While such means of securing a cap to the receptacle provides substantial security, threading may be prohibitively expensive or unnecessary in most applications. Nonetheless, threaded connections would add additional value to the holder due to their mechanical strength.

Advantageously, receptacle 106 is provided with grooving adjacent both open ends 249, 251 for accommodating a cap on either of ends 249, 251. Thus, the full potential of the joint 240 can be realized, as the receptacle may be rotated through a full 360° about the longitudinal axis LA through joint 240 and 180° between different vertical positions. Such rotatability presents a significant benefit of the present invention over prior clamp-on holder systems. Notably, either end of receptacle 106 may serve as the bottom support for objects placed within receptacle 106 and thus is configured for coupling a cap thereto, as described above. The end opposite the "bottom" end thus serves as the top open end of receptacle 106. Because gasket 246 is removable, it may alternately be placed at either end of receptacle 106 when "open" (i.e., not closed by a cap), thereby providing the desired vibration damping characteristics function discussed above.

As shown in FIG. 10, joint 240 preferably is not centered along the length of receptacle 106 along longitudinal axis LB. Instead, joint 240 is disposed substantially closer to one open end of receptacle 106 than the other open end. This is a significant advance over the designs of other holders due to an unexpected benefit of placing the joint 240 in an off-centered location. Because of the locking provided by coupling arm 104, and the freedom of rotation of receptacle 106 about joint 240, receptacle 106 may be configured for use by both tall and short beauticians. In particular, open ends 249, 251 of receptacle 106 are disposed along a longitudinal axis LB. Coupling arm 104 is coupled to receptacle 106 at a position along longitudinal axis LB closer to end 249 than end 251 for rotation between a first position, in which the receptacle longitudinal axis LB is vertical and the end 249 is positioned above coupling arm 104 at a first height, and a second position, in which the receptacle longitudinal axis LB is vertical and end 251 is positioned above the coupling arm at a second height higher than the first height. Thus, a shorter beautician will find placement of end 249 at the first height more convenient, while a taller beautician will be more comfortable with placement of end 251 at a second height.

With reference to the configuration depicted in FIG. 2, receptacle 106 is positioned with the open end being the end closest to coupling arm 104. In this configuration, when holder 100 is clamped to a chair or other surface, the holder is disposed for easy access by a short person. Alternatively, if receptacle 106 of FIG. 2 were to be rotated 180° about axis LA (FIG. 10), the other end of receptacle 106 will be disposed at a height substantially greater than in the previous configuration. This configuration permits the holder to be utilized by taller beauticians for easier access. The end cap, if any, may be relocated to the bottommost end of receptacle 106.

Referring to FIGS. 14 to 16, in another embodiment, a side bowl 300 may be detachably connected to receptacle 106. Preferably, side bowl 300 has a cylindrical wall 302 and an integral base 304. Receptacle 106 may be provided with keyholes 306 for receiving a key 308 protruding from wall 302. Key 308 is configured and dimensioned to interlock with keyhole 306, and preferably key 308 has a head portion 310 that is small enough so that when side bowl 300 is attached to receptacle 106, a bowl 242 may still be completely inserted into an open end of receptacle 106 without interference from key 308. Preferably, the size of side bowl 300 is selected to facilitate access to a supply of smaller hairstyling accessories, such as clips and bobby pins. Side bowl 300 preferably has a height 312 of 50 mm±10 mm, and a width 314 of 80 mm±10 mm. In a preferred embodiment, six keyholes are provided around receptacle 106. As only one keyhole 306 is typically needed for interlocking, the other keyholes 306 provide added ventilation.

Preferably, the materials used to form each of the components of holder 100 are selected according to criteria that include strength, weight, durability, chemical and heat resistance, cost of manufacture, and aesthetic qualities. In this regard, most portions of clamp 102, coupling arm 104, and receptacle 106 are formed from polymers. The polymer used for this purpose may be selected from a blend of polycarbonate and polybutyl-terapthilate, a blend of fiberglass and nylon, and a blend of glass-filled nylon. Threaded rods are preferably formed of metals or alloys, so that distortion and failure of the parts is minimized. The coupling joints, in particular the ball joints, may be integrally molded with clamp 102 and receptacle 106. The surface finish of such ball joints is preferably not smooth, as some surface roughness promotes enhanced gripping. For enhanced aesthetic presentation, outer surfaces of the components of holder 100 have a matte finish.

Figure 17:
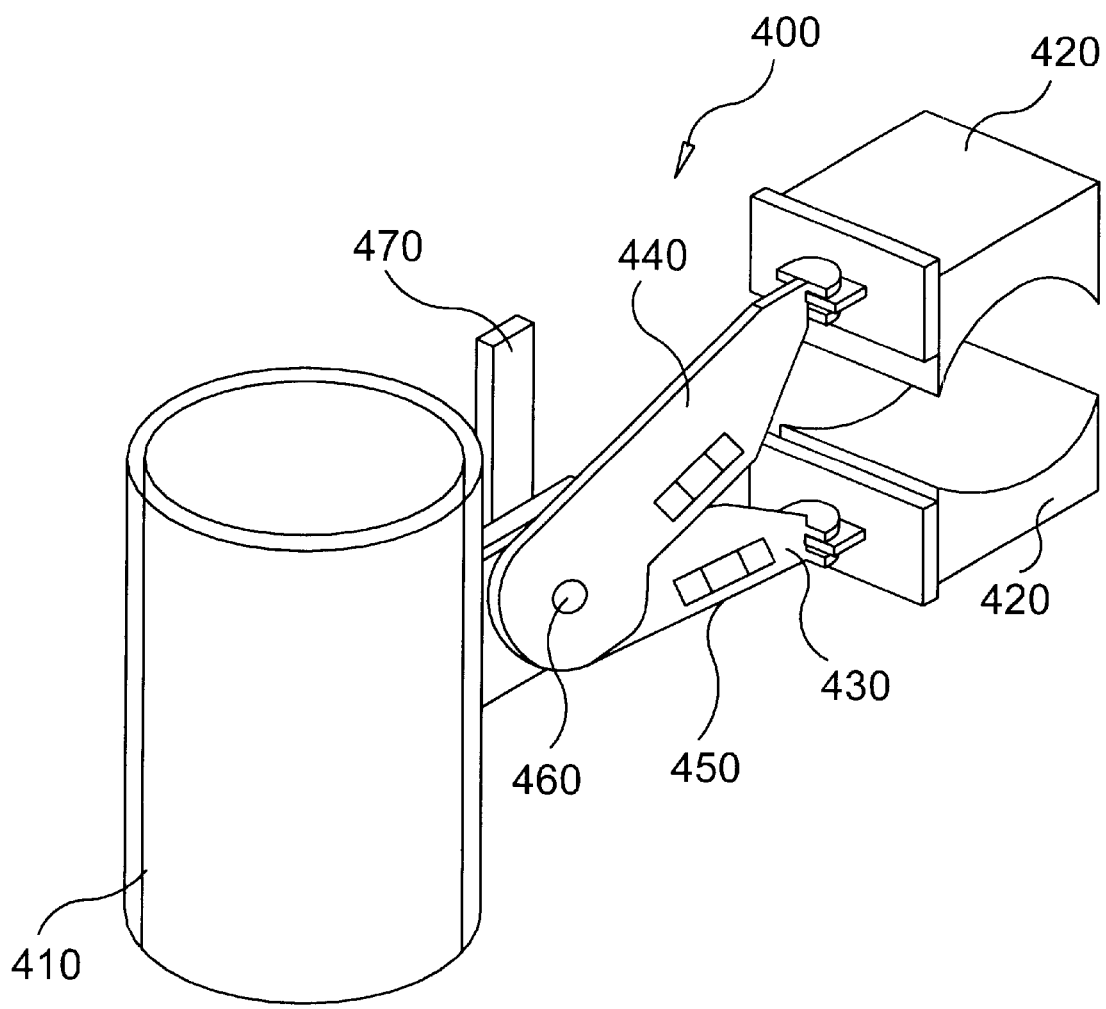
FIG. 17 is a perspective view of an alternate holder in accordance with a preferred embodiment of the present invention.

An alternate embodiment of the holder of the present invention is shown in FIG. 17. Similar to previous embodiments, the holder 400 has three principle components, including receptacle 410 configured to receive the nozzle of a conventional hair dryer, arm clamp means 420 effective to temporarily attach the holder to another object, and moveable attachment means 430, 440 joining receptacle 410 to clamp means 420. Preferably, the moveable attachment means 430, 440 are so-called "scissor means."

In a preferred embodiment, receptacle 410 is a long, hollow cup with a diameter about 2 to 4 inches. Preferably, the diameter is between 2.75 and 3.75 inches. More preferably, receptacle 410 is about 3.25 inches in diameter. Receptacle 410 is typically between about 3 and 8 inches tall, although it commonly is between about 4 and 6 inches tall. A particularly preferred height for receptacle 410 is about 5.5 inches.

Means 440 effectively attaches the holder to another object and may be of any conventional design. A useful embodiment of means 440 resembles a conventional C-clamp. In an embodiment in which means 440 is a C-clamp, means 440 is typically between about 0.5 and 2 inches wide, between about 3 and 5 inches long and between about 1.0 and 3.0 inches deep. Preferably, when means 440 is a C-clamp, means 440 is between about 0.75 and 1.5 inches wide, between about 2 and 3 inches long, and between about 2 and 3 inches deep. A particularly preferred design for means 440 is a C-clamp with a width of about 1.2 inches, a length of about 2.5 inches, and a depth of about 2.7 inches.

In a preferred embodiment of the present invention, moveable attachment means 430, 440 joining receptacle 410 to means 420 can be an arm 450 projecting from receptacle 410 and terminating in a ball-joint assembly in conjunction with means 420. In such an embodiment, the ball of the ball joint typically has a diameter between about 0.33 and 1 inch, and preferably the ball of the ball-joint has a diameter between about 0.5 and 0.75 inch. A particularly preferred diameter for the ball of the ball-joint embodiment of moveable attachment means 420 is about 0.625 inches. Moreover, the arm portion of the moveable attachment means 420 in this embodiment is typically between about 1.7 and 4 inches long. Preferably the arm portion of the moveable attachment means 420 in this embodiment is between about 2.4 and 3.2 inches long. A particularly preferred length for the arm portion of the moveable attachment means 420 in this embodiment is about 2.9 inches.

In a preferred embodiment, moveable attachment means 430, 440 joining receptacle 410 to means 420 can be a scissor clamp. In the embodiment when means 430, 440 is a scissor clamp, means 430, 440 is typically between about 0.5 and 1.5 inches wide, between about 3 and 5 inches long and between about 1 and 3 inches deep. It is preferred when means 430, 440 is a scissor clamp, means 430, 440 is between about 0.75 and 1.25 inches wide, between about 3.5 and 4.75 inches long and between about 1.1 and 2 inches in depth. In a particularly preferred design when means 430, 440 is a scissor clamp, the scissor clamp 430, 440 has a width of about 1 inch, a length of about 4.25 inches and a depth of about 1.4 inches.

In the more preferred embodiment, the receptacle holder 410 is joined to the moveable attachment means 420 (shown as arm-clamp) which is the form of a bipartite C-clamp by scissor means 430, 440 using a locking bolt 460. The locking bolt 460 is secured via handle 470 formed on receptacle 410. The opposite ends of the scissor means 430, 440 are secured to respective ends of the arm-clamp means 420 by bolts. The preferred length of the arm-clamp means 420 is typically about 1.7 to 3.5 inches. The arm clamp width of the moveable attachment means 420 in this embodiment is between 1.1 and 2.5 inches, and the arm clamp height of the moveable attachment means 420 in this embodiment is between 0.5 and 1.5 inches. Preferably, the arm clamp portion of the moveable attachment of this embodiment is between about 2.4 and 3.2 inches long. The arm clamp width of the moveable attachment means 420 in this embodiment is between 1.3 and 2.2 inches and the arm clamp height of the moveable attachment means 420 in this embodiment is between 0.7 and 1.3 inches. A particularly preferred length for the arm clamp portion of the moveable attachment means 420 in this embodiment is about 2.9 inches. A preferred width of the arm clamp means 420 is about 1.9 inches and the preferred height of the arm clamp means 420 is about 0.8 inches.

The multiple-joint design of the various embodiments of the present invention permits a high degree of adjustability of the positioning and mounting of holder 100 on the arm of a chair or about another surface. Advantageously, the holder may be positioned such that it is close to the side of the styling chair, for example, and may be located toward the rear portion of the chair arm to minimize interference with a customer and with the hairstylist.

While the invention has been shown and described herein with reference to particular embodiments, it is to be understood that the various additions, substitutions, or modifications of form, structure, arrangement, proportions, materials, and components and otherwise, used in the practice of the invention and which are particularly adapted to specific environments and operative requirements, may be made to the described embodiment without departing from the spirit and scope of the present invention. For example, the hair dryer holder may have one or more additional receptacles adapted to hold and/or store other hair styling tools such as scissors, combs, brushes, and bowls. Moreover, ball joints with fully spherical balls may be employed with modified locking mechanisms. In addition, other types of attachments may be snapped on to the ends of the receptacle. The presently disclosed embodiments are therefore to be considered in all respects as illustrative and not restrictive, the scope of the invention being indicated by the appended claims, and not limited to the foregoing description.

What is claimed is:

1. A clamp configured for securely being clamped to an arm of a standard hairstylist chair, said clamp comprising:
   a first jaw having a first clamping surface;
   a second jaw having a second clamping surface; and
   a side member having a guide portion and extending transverse to said first jaw between said first and said second jaw;
   wherein:
      said first jaw is fixedly coupled to said side member and said second jaw is operatively associated with said guide portion for linear movement with respect to said first jaw along said guide portion, with said first and second clamping surfaces facing each other for movement of said second clamping surface relative to said first clamping surface;
      said first clamping surface is arcuately shaped to engage a top surface of an upper noncylindrical surface of the arm of the standard hairstylist chair and has edges which are tapered or rounded;
      said second clamping surface is arcuately shaped with a radius of curvature selected to engage the lower surface of the arm of the standard hairstylist chair; and
      said second clamping surface is a unitary construction with at least two arcuate surfaces that are immovable with respect to each other and that each have a different radius of curvature.

2. A clamp as in claim 1, wherein said second clamping surface comprises a pair of outer arcuate surfaces straddling an inner arcuate surface.

3. A clamp as in claim 2, wherein said outer arcuate surfaces have a first radius of curvature and said inner arcuate surface has a second radius of curvature.

4. A clamp as in claim 3, wherein said first radius of curvature is larger than said second radius of curvature.

5. A clamp as in claim 3, wherein said first radius of curvature is approximately 44 mm.

6. A clamp as in claim 4, wherein said second radius of curvature is approximately 13 mm.

7. A holder for supporting and holding at least one article relative to and spaced apart from a support surface, said holder comprising:
   a hollow receptacle configured to receive and hold at least one article; and
   a coupling arm coupled to said receptacle and configured for coupling to a support surface;
   wherein:
      said receptacle has a longitudinal axis and first and second open ends along said longitudinal axis;
      said coupling arm is coupled to said receptacle at a position along said receptacle longitudinal axis closer to said first end than said second end for rotation of said receptacle between a first position, in which said receptacle longitudinal axis is vertical and said first end is positioned above said coupling arm at a first height, and a second position, in which said receptacle longitudinal axis is vertical and said second end is positioned above said coupling arm at a second height higher than said first height;
      said receptacle is positioned for holding an article by positioning said receptacle such that one of said first and second ends is above said coupling arm and the other of said first and second ends is below said coupling arm;
      said receptacle further comprises a cap on said one of said first and second ends below said coupling arm to form an interior holding chamber with a bottom support surface within said receptacle;

said support surface comprises a chair arm;

said cap is configured for detachable connection to either of said first and second ends of said receptacle to form said bottom support surface of said interior holding chamber within said receptacle;

said cap has a plurality of detents along a periphery thereof;

said receptacle has an interior surface extending within said receptacle between said first and second ends; and a plurality of grooves shaped for engagement with said detents are provided circumferentially around said interior surface of said receptacle at a first longitudinal position adjacent said first end of said receptacle and at a second longitudinal position adjacent said second end of said receptacle;

whereby said cap is readily attachable and detachable to said first and second ends of said receptacle.

8. A holder for supporting and holding at least one article relative to and spaced apart from a support surface, said holder comprising:

a hollow receptacle configured to receive and hold at least one article;

a coupling arm coupled to said receptacle and configured for coupling to a support surface; and a bowl adapted for attachment to a side of said receptacle to hold articles significantly smaller than the interior of said bowl;

wherein:

said receptacle has a longitudinal axis and first and second open ends along said longitudinal axis; and said coupling arm is coupled to said receptacle at a position along said receptacle longitudinal axis closer to said first end than said second end for rotation of said receptacle between a first position, in which said receptacle longitudinal axis is vertical and said first end is positioned above said coupling arm at a first height, and a second position, in which said receptacle longitudinal axis is vertical and said second end is positioned above said coupling arm at a second height higher than said first height.

* * * * *

UNITED STATES PATENT AND TRADEMARK OFFICE
CERTIFICATE OF CORRECTION

PATENT NO. : 6,601,813 B1
DATED : August 5, 2003
INVENTOR(S) : Kevin F. Kager and Vincent J. Conticelli It is certified that error appears in the above-identified patent and that said Letters Patent is hereby corrected as shown below:

Column 12,
Line 39, replace "4" with -- 3 --.

Signed and Sealed this

Sixteenth Day of December, 2003

JAMES E. ROGAN
*Director of the United States Patent and Trademark Office*